United States Patent
Wu et al.

(10) Patent No.: US 6,788,349 B2
(45) Date of Patent: Sep. 7, 2004

(54) METHOD AND SYSTEM FOR BROADCASTING A DIGITAL DATA SIGNAL WITHIN AN ANALOG TV SIGNAL USING ORTHOGONAL FREQUENCY DIVISION MULTIPLEXING

(75) Inventors: Yiyan Wu, Ottawa (CA); Alain Bergeron, Calgary (CA); Jean-Yves Chouinard, Gatineau (CA)

(73) Assignee: Her Majesty of Queen in right of Canada, as respresented by the Minister of Industry, Ottawa (CA)

( * ) Notice: Subject to any disclaimer, the term of this patent is extended or adjusted under 35 U.S.C. 154(b) by 465 days.

(21) Appl. No.: 09/832,803

(22) Filed: Apr. 12, 2001

(65) Prior Publication Data

US 2002/0001350 A1 Jan. 3, 2002

Related U.S. Application Data

(60) Provisional application No. 60/196,300, filed on Apr. 12, 2000.

(51) Int. Cl.[7] .............................. H04N 7/08; H04N 5/21
(52) U.S. Cl. ....................... 348/473; 348/608; 375/260; 375/286
(58) Field of Search ................................. 348/473, 476, 348/477, 478, 479, 607, 614, 624, 608, 612; 375/260, 216, 295, 298, 309, 286, 288, 301; 370/208, 210; H04N 7/08, 5/21

(56) References Cited

U.S. PATENT DOCUMENTS

| | | | |
|---|---|---|---|
| 4,884,139 A | | 11/1989 | Pommier |
| 5,291,289 A | | 3/1994 | Hulyalkar et al. |
| 5,371,548 A | | 12/1994 | Williams |
| 5,488,632 A | | 1/1996 | Mason et al. |
| 6,118,805 A | * | 9/2000 | Bergstrom et al. .......... 370/208 |
| 6,246,698 B1 | * | 6/2001 | Kumar ........................ 370/487 |
| 6,563,880 B1 | * | 5/2003 | Hunsinger et al. .......... 375/260 |

OTHER PUBLICATIONS

Wu et al., Communications Research Centre, "OFDM Modulation for Data Broadcasting in Analog TV Channel", Ottawa, Canada.

* cited by examiner

*Primary Examiner*—Sherrie Hsia
(74) *Attorney, Agent, or Firm*—Freedman & Associates

(57) ABSTRACT

The present invention relates to a method and system for transmitting digital data within an analog TV signal. Digital data are received from a data source. The digital data are then multilevel encoded and a plurality of data symbols in dependence thereupon is provided. Each of the plurality of data symbols is modulated in frequency domain onto a carrier of a plurality of carriers such that each carrier carries a different data symbol. The modulation step is based on an OFDM method and is performed using a serial to parallel converter. After modulation a digital data signal is provided. Some carriers of the plurality of carriers are turned off in the modulation process in order to shape the spectrum of the digital data signal such that the spectrum of the digital data signal comprises notches at locations coinciding with locations of spectral components in the vestigial sideband of the video carrier of the analog TV signal. The width of the notches is determined such that degradation of the analog TV signal due to the transmission of the digital data within the analog TV signal is substantially reduced. After IFFT transformation into time domain and D/A conversion the digital data signal is combined with the analog TV signal by inserting the digital data signal in the vestigial sideband of the video carrier. The digital data broadcasting technique according to the invention is capable of transmitting digital data within an analog TV signal at a substantial higher data transmission rate than prior art systems without causing any degradation to the picture quality noticeable to non-expert viewers.

22 Claims, 9 Drawing Sheets

METHOD AND SYSTEM FOR BROADCASTING A DIGITAL DATA SIGNAL WITHIN AN ANALOG TV SIGNAL USING ORTHOGONAL FREQUENCY DIVISION MULTIPLEXING

This application claims the benefit of U.S. Provisional Application No. 60/196,300, filed Apr. 12, 2000.

FIELD OF THE INVENTION

The invention relates generally to the transmission of a digital data signal combined with an analog TV signal, in particular to a method and system for encoding the digital signal using Orthogonal Frequency Division Multiplexing (OFDM) and combining it with an analog TV signal.

BACKGROUND OF THE INVENTION

With the evolution of digital technologies and the demand for increased bandwidth for digital services, considerable research efforts have been done to widen the information superhighway reaching the end user. With the advent of digital radio and digital television each system will offer additional bandwidth to end-users. However, there will be a long transition period until a substantial number of end-users receive digital radio or digital television. Since the mid 1980's, television broadcasters have been inserting additional data into a portion of the analog television signal. The content of this information has been used for applications, such as stock market updates, weather updates, news services, and closed-captioned programs allowing hearing impaired users to watch and follow the transmitted television programs.

With recent developments in the area of digital technologies, newer systems have been proposed to improve the available bit rate for such information. In these systems, the information is transmitted over digitally modulated carriers. One system designed by Digideck Inc. uses a low level Differential Quadrature Phase Shift Keying (DQPSK) carrier to transmit the data. The carrier is located in the vestigial side band, approximately 1.0 MHz below the video carrier and has a bandwidth of 450 kHz. Another system developed by WavePhore Inc. uses a phase-modulated sub-carrier that is located between the color subcarrier and the audio subcarrier. Both of these systems inherently cause some degradation to the picture quality by inserting a data carrier in the active portion of the video signal. To ensure that the impact of the data carriers would not be clearly visible to non-expert viewers, both systems where studied using subjective evaluation methodologies. However, both systems provide only a low bit rate for the transmission of a digital data signal and have, furthermore, a substantial impact on the video signal quality.

U.S. Pat. No. 4,884,139 issued Nov. 28, 1989 to Pommier and U.S. Pat. No. 5,291,289 issued Mar. 1, 1994 to Hulyalkar et al. disclose a method and system for digital broadcasting in an analog TV environment. Pommier and Hulyalkar et al. teach multi carrier modulation in the form of an OFDM of a digital data signal and transmission of the same in a channel where analog television transmission and reception are impossible, i. e. transmission of the digital signal in so-called "taboo-channels". In order to reduce co-channel interference the digital signal is interlaced with odd multiples of half the line frequency of the analog TV spectrum. However, with the introduction of ever more TV programs the number of available taboo-channels for such a digital data transmission is substantially decreasing. Furthermore, these methods do not allow, for example, a TV station to introduce digital data signal broadcasting using its allotted analog TV spectra for simultaneously broadcasting the digital data signal and the analog TV signal.

It is, therefore, an object of the invention to provide a method and system for encoding and transmitting a digital data signal at a higher bit rate than the prior art within an analog TV signal.

It is further an object of the invention to provide a method and system for encoding a digital data signal using OFDM and spectral shaping in frequency domain in order to minimize the impact of the digital data signal on the analog TV signal.

SUMMARY OF THE INVENTION

In accordance with the present invention there is provided a method for transmitting digital data within an analog TV signal comprising the steps of:

receiving the digital data from a data source;

multilevel encoding the digital data and providing a plurality of data symbols in dependence thereupon;

modulating in frequency domain each of the plurality of data symbols onto a carrier of a plurality of carriers such that each carrier carries a different data symbol by using a serial to parallel converter for providing a digital data signal in dependence thereupon, wherein some carriers of the plurality of carriers are turned off to shape the spectrum of the digital data signal such that the spectrum of the digital data signal comprises notches at locations coinciding with locations of spectral components of the analog TV signal, and wherein the width of the notches is determined such that degradation of the analog TV signal due to the transmission of the digital data within the analog TV signal is substantially reduced;

transforming the digital data signal into time domain;

combining the digital data signal with the analog TV signal; and, transmitting the combined digital data and analog TV signal.

In accordance with the present invention there is further provided a method for receiving digital data within an analog TV signal comprising the steps of:

receiving the combined digital data and analog TV signal;

separating the digital data signal from the analog TV signal;

transforming the digital data signal into frequency domain; and, multilevel decoding the digital data signal using a parallel to serial converter in order to obtain the digital data.

In accordance with an aspect of the present invention there is provided a method for transmitting digital data within an analog TV signal comprising the steps of:

receiving the digital data from a data source;

multilevel encoding the digital data and providing a plurality of data symbols in dependence thereupon;

modulating in frequency domain each of the plurality of data symbols onto a carrier of a plurality of carriers such that each carrier carries a different data symbol using a serial to parallel converter for providing a digital data signal in dependence thereupon, wherein some carriers of the plurality of carriers are turned off in order to shape the spectrum of the digital data signal such that the spectrum of the digital data signal comprises notches at locations coinciding with locations of spectral components in the vestigial sideband of the video carrier of the analog TV signal, and wherein the width of the notches is determined such that degradation of the analog TV signal due to the transmission of the digital data within the analog TV signal is substantially reduced;

transforming the digital data signal into time domain using IFFT;

D/A converting the digital data signal;

combining the digital data signal with the analog TV signal by inserting the digital data signal in the vestigial sideband of the video carrier;

RF upconverting the combined digital data and analog TV signal to a broadcaster's RF frequency; and, transmitting the upconverted combined digital data and analog TV signal.

In accordance with another aspect of the present invention there is provided a system for transmitting digital data within an analog TV signal comprising:

a port for receiving the digital data from a data source;

a processor for encoding the digital data and providing data symbols, for modulating in frequency domain each of the data symbols onto a carrier of the plurality of carriers such that each carrier carries a different data symbol using a serial to parallel converter for providing a digital data signal, wherein some carriers of the plurality of carriers are turned off in order to shape the spectrum of the digital data signal such that the spectrum of the digital data signal comprises notches at locations of spectral components of the analog TV signal, and for transforming the digital data signal into time domain using IFFT;

a D/A converter for converting the digital data signal;

a combiner for combining the digital data signal with the analog TV signal; and, a RF upconverter for upconverting the combined signal to a broadcaster's RF frequency for transmission.

In accordance with the other aspect of the present invention there is further provided a system for receiving digital data within an analog TV signal comprising:

a second other port for receiving the transmitted signal;

a tuner for downconverting the received signal and for separating the digital data signal from the analog TV signal;

an A/D converter for converting the digital data signal; and, a processor for low pass filtering the digital data signal, for transforming the digital data signal into frequency domain using FFT, and for multilevel decoding the digital data signal using a parallel to serial converter in order to obtain the digital data.

BRIEF DESCRIPTION OF FIGURES

Exemplary embodiments of the invention will now be described in conjunction with the following drawings, in which.

Table 1 lists carrier spacing for different values of $f_s$ and N; and,

Table 2 lists the number of carriers within a 15.75 kHz interval for different values of $f_s$ and N.

DETAILED DESCRIPTION OF PREFERRED EMBODIMENTS

In North America, the analog TV standard is called the National Television System Committee (NTSC) television standard. The NTSC standard and the frequency allocation of the channels are uniform across North America. Variations of the NTSC standard are used in parts of South America, Japan and Taiwan. The various embodiments of the invention will, therefore, be described in connection with the NTSC standard. As is evident for those of skill in the art, this does not limit the invention to this standard but is also applicable using other TV standards, for example, TV standards used in European countries.

The motion displayed on a television screen is perceived due to the display of approximately 30 static images per second. The human brain merges the images giving the effect of motion. An image frame consists of 525 lines in the video signal. Each frame consists of two interlaced fields; a first field displays the odd numbered lines and a second field displays the even numbered lines. The first 21 lines of each frame—called the vertical-blanking interval (VBI)—are reserved for synchronizing and cannot be used to transmit a video signal. With the current technology, only the first nine lines are necessary for synchronization. The remaining 12 lines are now used by broadcasters for other services such as close captioning and to deliver digital data to viewers. The remaining 504 lines are used for the transmission of the video signal. Each line of the video signal has an active portion, which transmits the content of the image, and a non-active portion called the Horizontal Blanking Interval (HBI). The HBI is composed of the synchronization pulse and the color burst. The synchronization pulse is used to return the electron gun of the TV set to the left of the screen and the color burst is used as a reference in decoding the color of the currently transmitted line.

Figure 1:
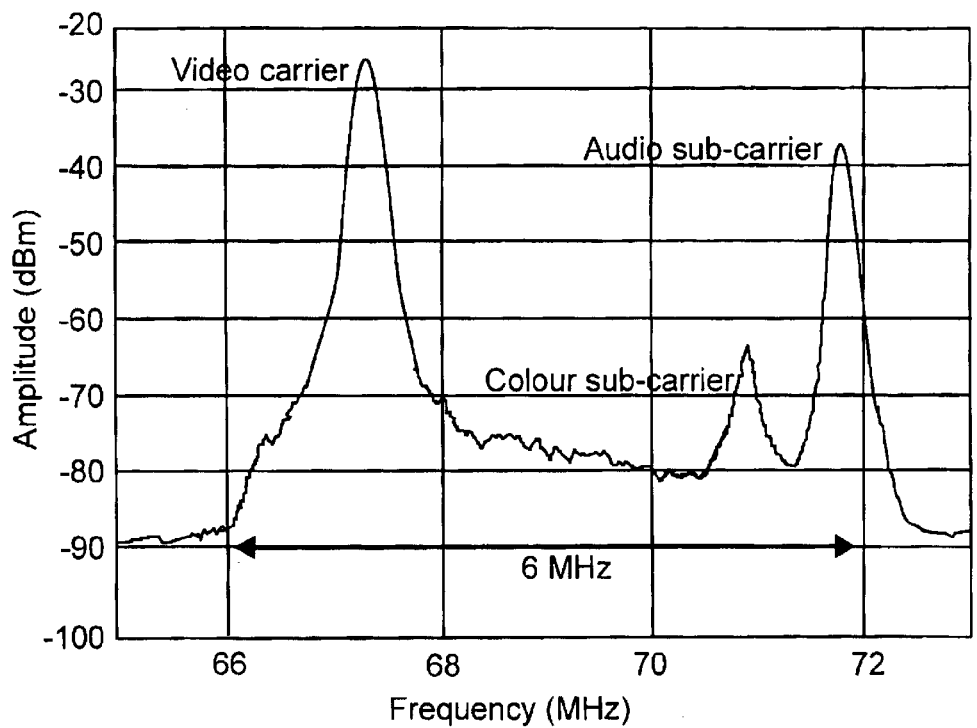
FIG. 1 illustrates the spectrum of a 6 MHz NTSC TV signal after modulation onto a carrier for transmission.

FIG. 1 shows the spectrum of a 6 MHz NTSC TV signal after modulation onto a carrier for transmission. The analog TV signal consists of three carriers: video carrier, audio sub-carrier and color sub-carrier. The main carrier is the video carrier and is obtained by vestigial side-band amplitude modulation of the video signal. The video carrier is located 1.25 MHz above the lower channel edge. The two sub-carriers within the channel are the color burst, 3.58 MHz above the video carrier, and the audio FM sub-carrier, 4.5 MHz above the video carrier.

Figure 2:
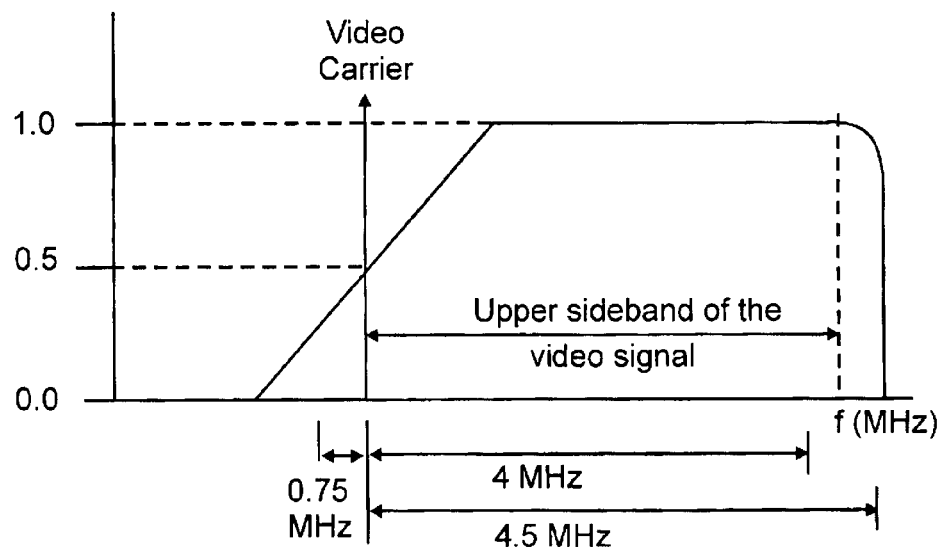
FIG. 2 illustrates the spectrum of a VSB filter.

Vestigial side-band (VSB) modulation is used to modulate the video signal onto a radio frequency (RF) carrier, because of the large bandwidth and significant low frequency components of the video signal. The VSB signal is obtained by filtering a double side-band amplitude modulated signal using a filter with a frequency response that allows the upper side-band to be completely transmitted while only a vestige of the lower side-band is transmitted, as shown in FIG. 2.

Currently, TV broadcasting stations use three methods for transmitting digital data within the analog television signal. These methods have been in operation for quite some time and their available data rate is slow compared to today's' standards. The most popular method uses the VBI to transmit data during the time interval where no video information is transmitted. The second method, called "overscan", inserts a digital data signal in the HBI. This alternative uses the same strategy as the VBI methods except the data rate is not as high. The third method called "sub-video" or "in-band" inserts a digital data signal carrier within the spectrum of the active video signal. Digideck Inc. and WavePhore Inc. have developed systems based on this method.

In the following a method and system for multi-carrier data broadcasting within an analog TV signal using OFDM according to the invention will be disclosed. The major constraint to current digital data broadcasting techniques is the impact the data signals have on the picture quality. The method and system according to the invention provides data rates that are substantially higher than the data rates of the current technology and, furthermore, a multi-carrier data signal is inserted within the video signal without causing noticeable degradation of the picture quality.

Figure 3:
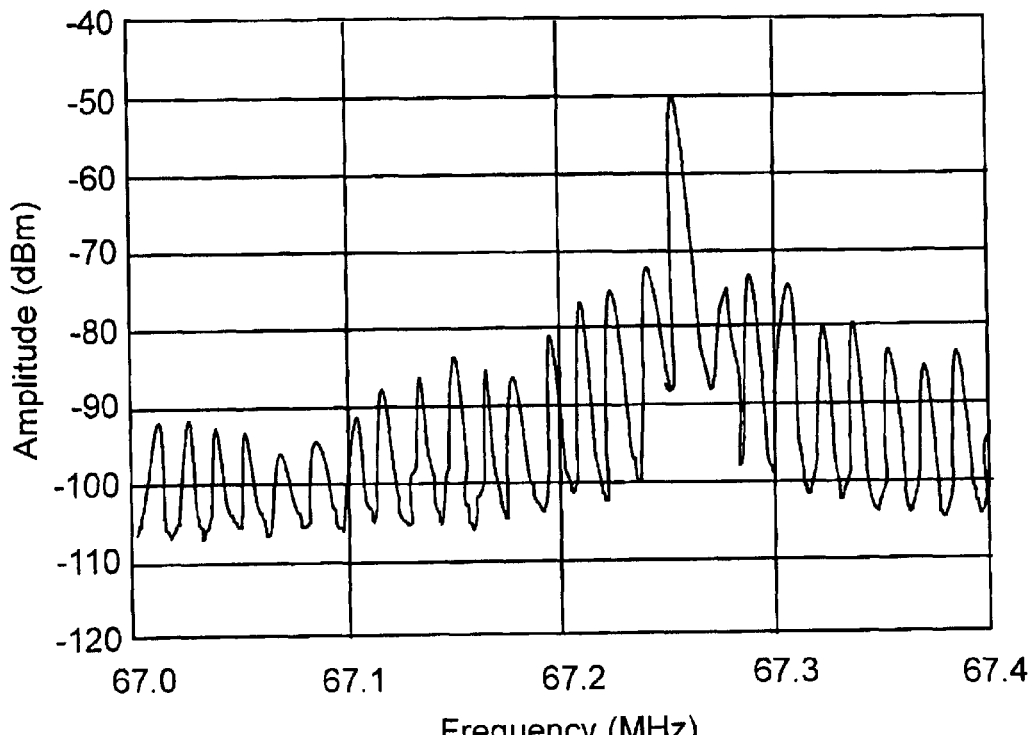
FIG. 3 illustrates the spectrum of the video carrier in an analog TV signal.
Figure 4:
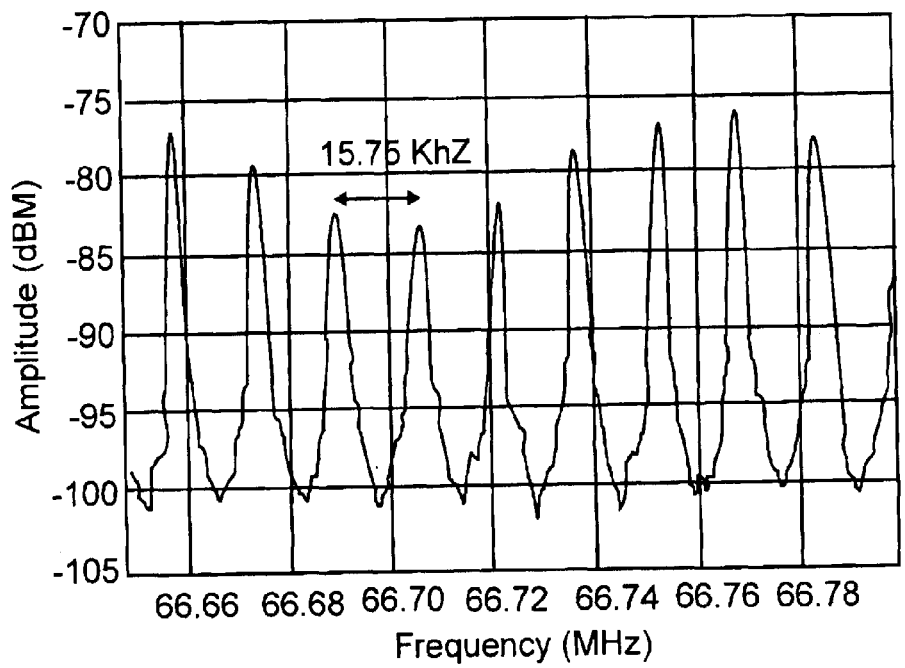
FIG. 4 illustrates the spectral components of a NTSC signal.

FIG. 3 illustrates the spectrum of the video signal with a frequency span of 400 kHz and a resolution bandwidth (RBW) smaller than 15 kHz. The video signal comprises over 250 distinct spectral components separated by 15.75 kHz, which is the inverse of a line period of 63.5 $\mu$s. The location of the spectral components is fixed in frequency, but varies in amplitude with the content of the video signal. The peak represents the frequency of the video carrier. FIG. 4 illustrates a few spectral components of the video signal with a frequency span of 150 kHz and RBW of 1 kHz.

The invention takes advantage of the characteristics of these spectral components to combine the digital data signal with the video signal. In order to minimize the effect of the digital data signal on the video signal, the spectrum of the digital data signal has to be confined within the notches of the video signal. Therefore, the digital data signal must have notches in the spectrum 15.75 kHz apart and the notches must be wide enough that the digital data signal does not interfere with the video signal.

Figure 5:
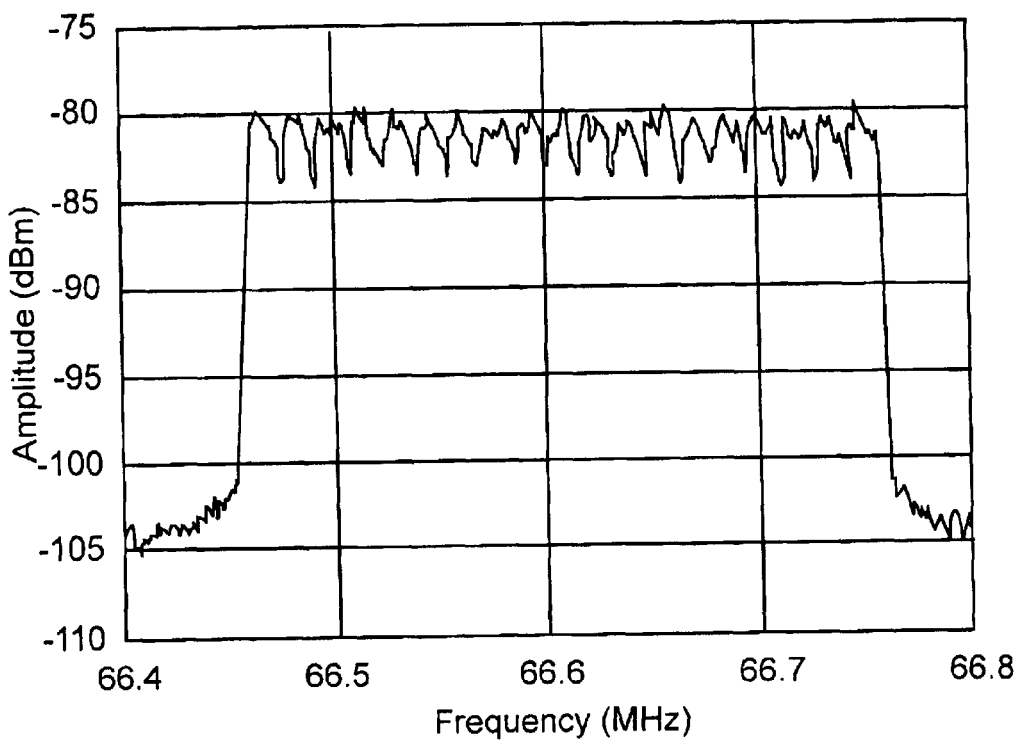
FIG. 5 illustrates a 300 kHz wide OFDM symbol spectrum created according to the invention.
Figure 6:
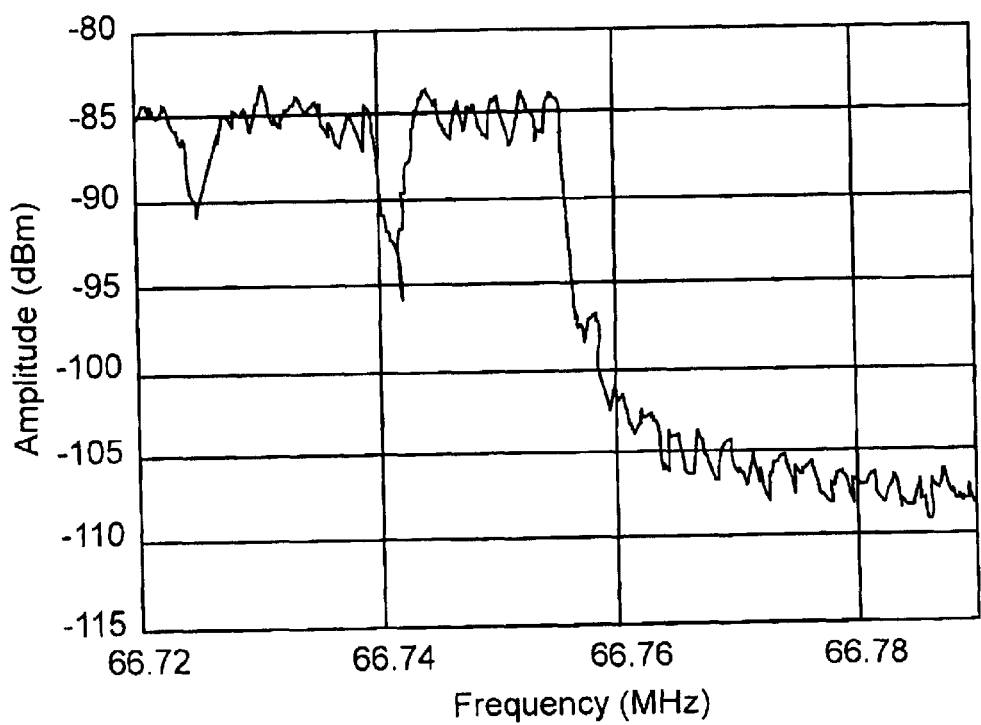
FIG. 6 illustrates an edge of the 300 kHz wide OFDM symbol spectrum shown in FIG. 5.
Figure 7:
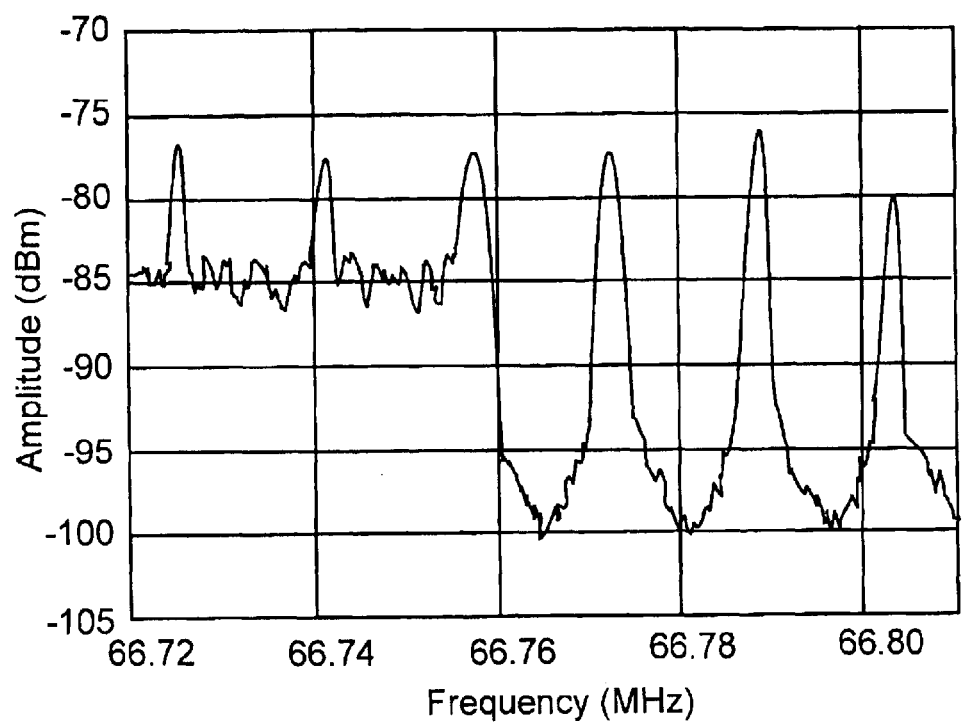
FIG. 7 illustrates the edge of the 300 kHz wide OFDM symbol spectrum shown in FIG. 6 combined with an NTSC signal.

The OFDM, which will be explained later in more detail, is a form of a multi-carrier modulation scheme, where data are transmitted in parallel in frequency domain on a plurality of carriers. Removing, or turning off, some OFDM carriers allow the creation of spectrum notches. By coding the digital data with an Inverse Fast Fourier Transform (IFFT) during OFDM it is possible to create the spectrum notches in the digital signal by placing a zero at a particular bin at the input of the IFFT. The width of the spectral notches is determined by the number of consecutive zeros at the input of the IFFT. FIG. 5 shows the spectrum of a 300 kHz wide digital data signal with 18 notches separated by 15.75 kHz. A more detailed view of an edge of the spectrum of the digital signal is shown in FIG. 6 with a RBW of 1 kHz. Here, two spectral notches in the digital signal are clearly visible. These spectral notches are fixed in frequency and are exactly located at positions of the spectral components of the video signal in the frequency spectrum of the video signal. The creation of a digital signal having such a characteristic in frequency domain allows to substantially reduce or even to avoid interference with an active video signal when the two signals are combined for transmission. FIG. 7 illustrates the combination of the edge of the digital data signal shown in FIG. 6 with an anaolg video signal according to the invention. The fit of the spectral notches of the digital signal with the spectral components of the video signal in the left side of the diagram is clearly visible. The combination of the two signals results in a more "flat" spectrum indicating a more efficient use of the spectrum from the communication theory point of view.

Figure 8:
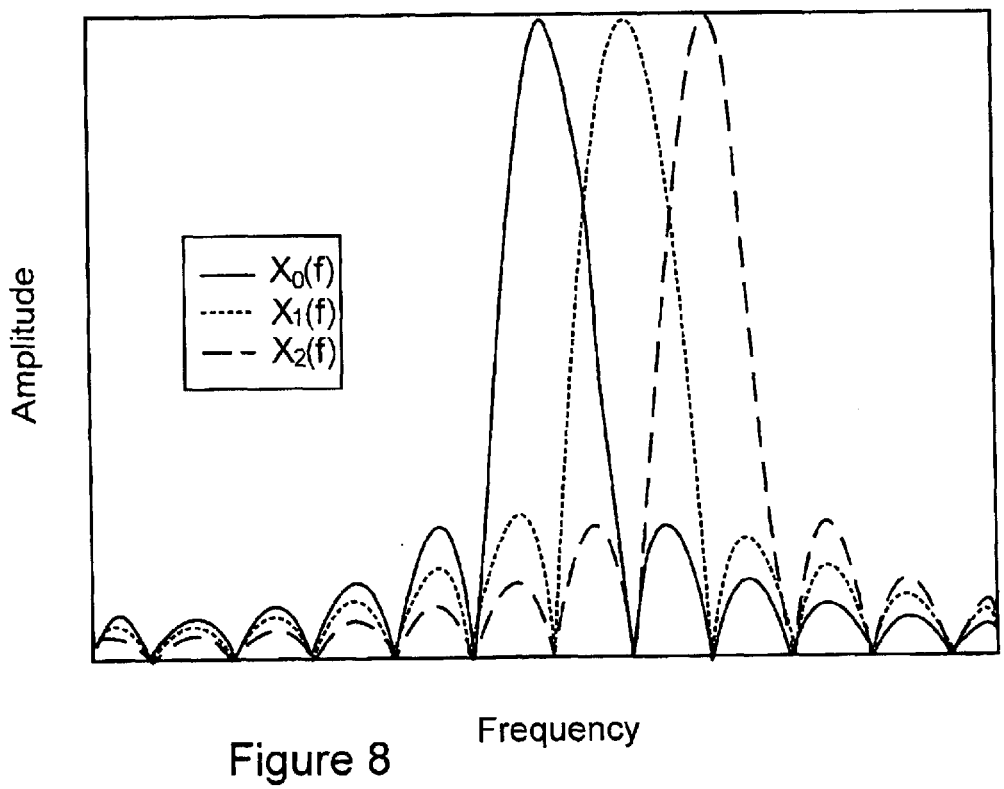
FIG. 8 illustrates an OFDM spectrum comprising 3 carriers.

In OFDM the spectrum of the digital data signal is divided into smaller sub-bands and each sub-band is modulated by a different carrier frequency, wherein the carrier frequencies are orthogonal to each other. The following example describes the implementation of an OFDM. Let the spectra of three OFDM sub-carriers be defined as:

$$x_0(n) = \begin{cases} 1 & 0 \leq n \leq N-1 \\ 0 & \text{otherwise} \end{cases} \quad (1)$$

$$x_1(n) = \begin{cases} e^{j2\pi n/N} & 0 \leq n \leq N-1 \\ 0 & \text{otherwise} \end{cases} \quad (2)$$

$$x_2(n) = \begin{cases} e^{j4\pi n/N} & 0 \leq n \leq N-1 \\ 0 & \text{otherwise} \end{cases} \quad (3)$$

Where $x_0$ (n) is a N—point rectangular pulse, $x_1$ (n) is a single cycle of a complex sinusoid and $x_2$ (n) is two cycles of a complex sinusoid, each defined over a N—point interval. The spectrum of the three combined signals is shown in FIG. 8. The spectrum of each OFDM carrier has one main lobe and N—1 zeros. The main lobe of each OFDM carrier overlaps with the zeros of every other OFDM carrier. This condition remains as long as the frequencies remain orthogonal.

By extending this example, it is possible to design a signal consisting of N sub-carriers, each carrying a different symbol of information. Let the $k^{th}$ sub-carrier transmitting symbol $m_k$ be defined as:

$$x_k(n) = \begin{cases} m_k e^{j2\pi kn/N} & 0 \leq n \leq N-1 \\ 0 & \text{otherwise} \end{cases} \quad (4)$$

The sum of N carriers is then given by $$x(n) = \begin{cases} \sum_{k=0}^{N-1} m_k e^{j2\pi kn/N} & 0 \leq n \leq N-1 \\ 0 & \text{otherwise} \end{cases} \quad (5)$$

Which is equivalent to $$x(n) = \begin{cases} N\left[\frac{1}{N}\sum_{k=0}^{N-1} m_k W_N^{-kn}\right] & 0 \leq n \leq N-1 \\ 0 & \text{otherwise} \end{cases} \quad (6)$$

with the substitution $W_N = e^{-j2\pi 1/N}$.

In equation (6) the term in brackets is the Inverse Discrete Fourier Transform (IDFT). Therefore, computing the IDFT on a sequence of parallel symbols and multiplying the result by N generates an OFDM symbol.

At the receiver, the sequence of parallel symbols is recovered by computing the Discrete Fourier Transform (DFT) on the OFDM symbol. In practice the DFT and IDFT are implemented as Fast Fourier Transforms (FFT) and (IFFT), respectively.

Figure 9:
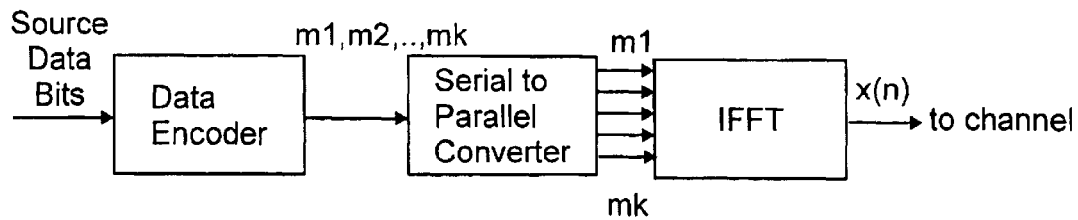
FIG. 9 is a is a simplified block diagram of an OFDM modulator.

Referring to FIG. 9 a simplified block diagram of an OFDM modulator is shown. Source data are encoded using a data encoder for providing data symbols $m_1, m_2, \ldots m_k$. Each of the data symbols is then modulated onto a carrier in a serial to parallel converter according to equation (4). A sum of parallel carriers, see equation (5) is then transformed into time domain using IFFT—equation (6) for transmission. The modulation of the data symbols onto parallel carriers allows the spectral shaping of the digital data signal in frequency domain by switching off carriers for creating the required notches in the spectrum of the digital data signal. This allows the creation of spectral notches at predefined locations in the spectrum, which is essential for substantially reducing or even avoiding the impact of the digital data signal onto an active video carrier after combination.

The transmission of any signal over a terrestrial channel is always susceptible to multipath interference. The effect of multipath interference on an analog TV signal results in ghost images displayed on the TV screen. In the transmission of a digital data signal multipath interference causes different versions of the transmitted signal to arrive at the receiver, all at different time instances. When more than one symbol arrives at the input of the decoder intersymbol interference occurs and the decoder is unable to distinguish between the different symbols. To protect multi-carrier symbols against multipath propagation effects a block of known data—called the guard interval—is inserted at the beginning of the symbol before transmission. The guard interval contains a fraction of the original symbol. Since the carriers within a symbol are cyclic, the addition of a guard interval is also cyclic. From this results that as long as the delay of the multipath is shorter than the guard interval all the components at the input of the FFT are from a same symbol and the orthogonality criteria will be maintained after the FFT is computed.

Figure 10:
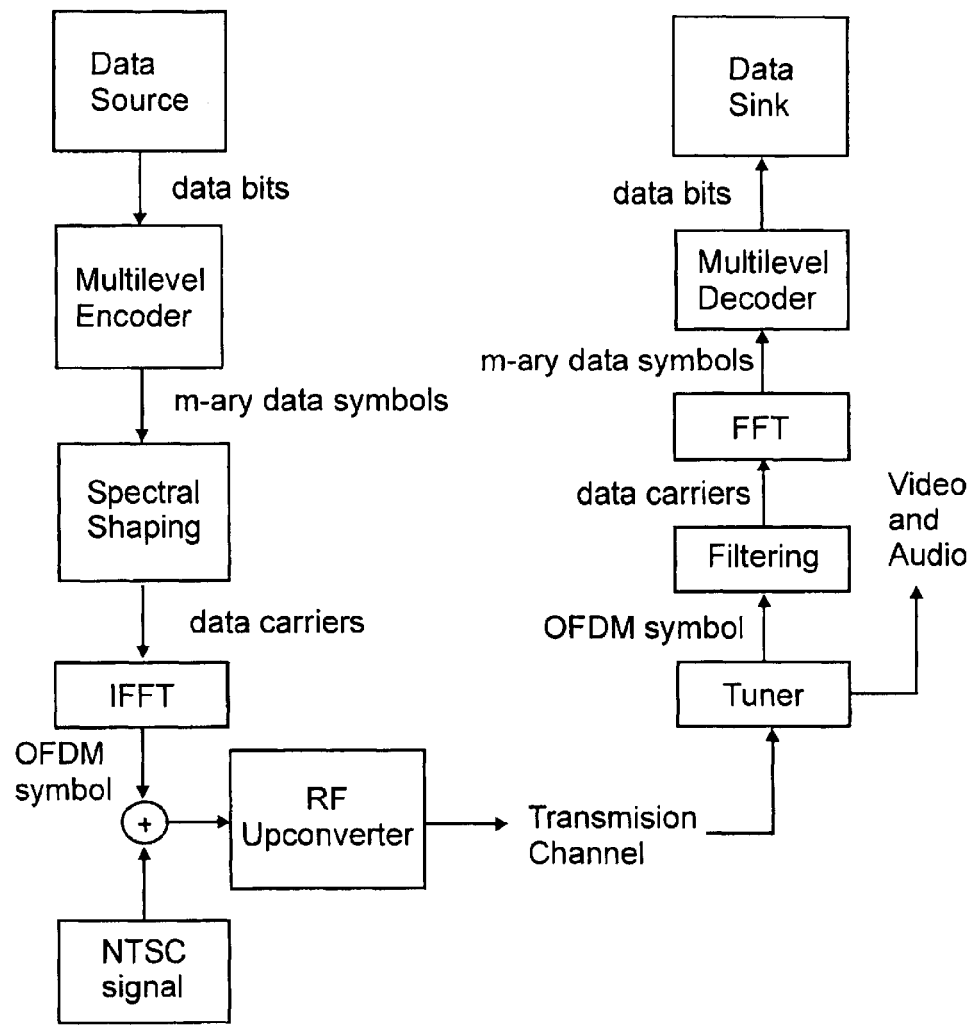
FIG. 10 is a simplified block diagram of a method according to the invention for transmission of digital data within an analog TV signal.

FIG. 10 illustrates schematically the broadcasting of digital data within an NTSC TV signal according to the invention. A data source provides data bits, which are encoded in a multilevel encoder into m-ary data symbols. Each of the m-ary data symbols is then modulated onto a carrier in a serial to parallel converter and spectral shaping of the digital data signal in frequency domain is performed. The spectral shaping ensures that the notches are properly positioned within the spectrum of the digital data signal while the data symbols are transformed into data carriers. The IFFT transforms the data carriers into OFDM symbols providing the digital data signal in time domain. The digital data signal is then combined with the NTSC signal and provided to a RF Upconverter for transmission.

Figure 11:
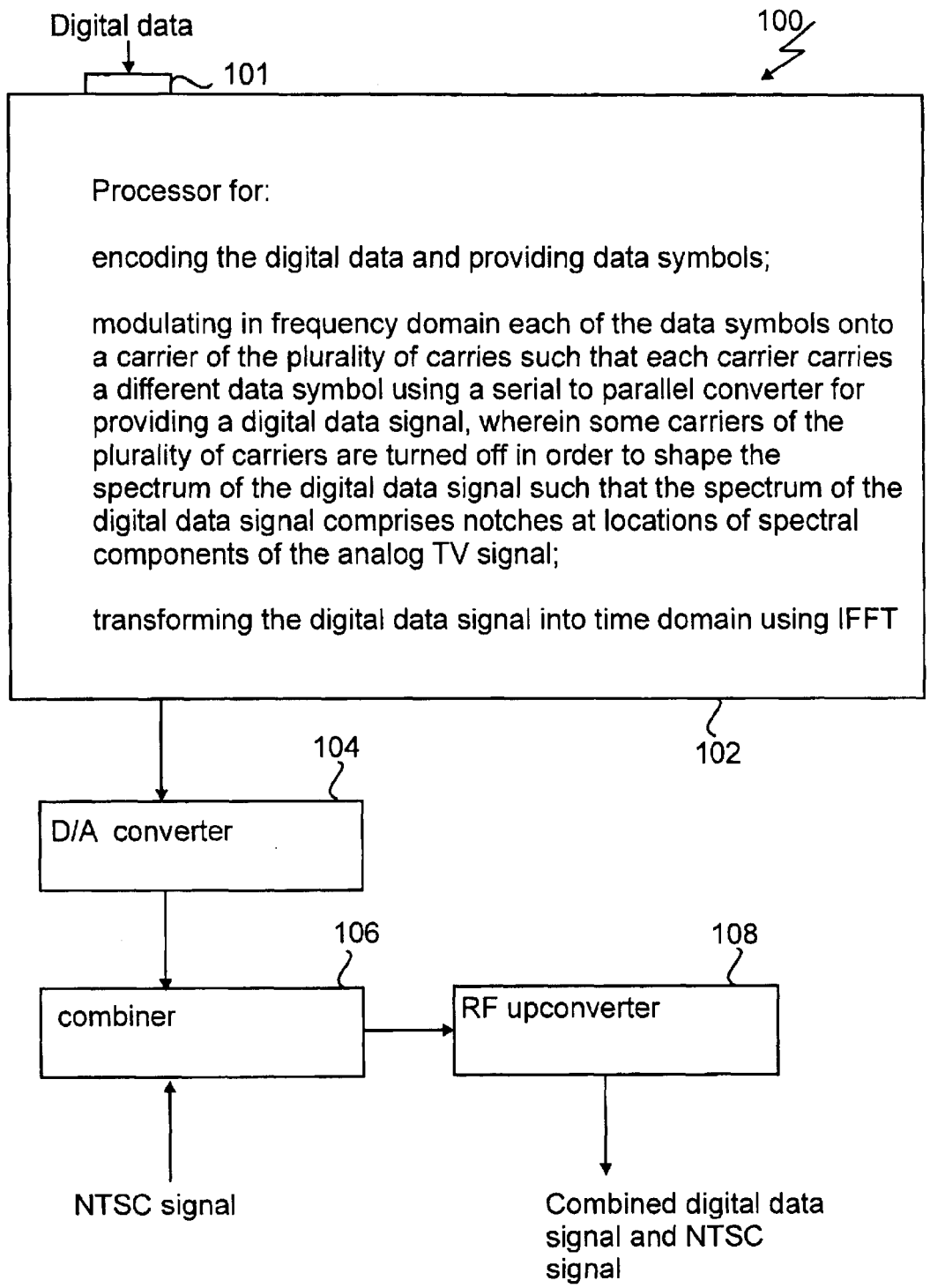
FIG. 11 is a simplified block diagram of a system according to the invention for broadcasting digital data within an analog TV signal.

As shown in FIG. 11, the system 100 for broadcasting digital data within an NTSC signal according to the invention the digital data are provided to a processor 102 via port 101. Using the processor 102 the digital data are encoded, modulated onto a carrier combined with spectral shaping and converted from frequency domain into time domain using IFFT. The digital data signal is then converted into an analog signal using D/A converter 104. The analog signal is then provided to combiner 106 where it is combined with the analog NTSC signal before provision to RF Upconverter 108 for upconverting the combined signal to a broadcaster's RF frequency for transmission.

Alternatively, but not preferably, the steps of frequency domain modulation, spectral shaping and IFFT are performed using analog devices instead of a digital processor. However, the use of analog devices will result in a loss of accuracy in the spectral shaping of the data signal.

Figure 12:
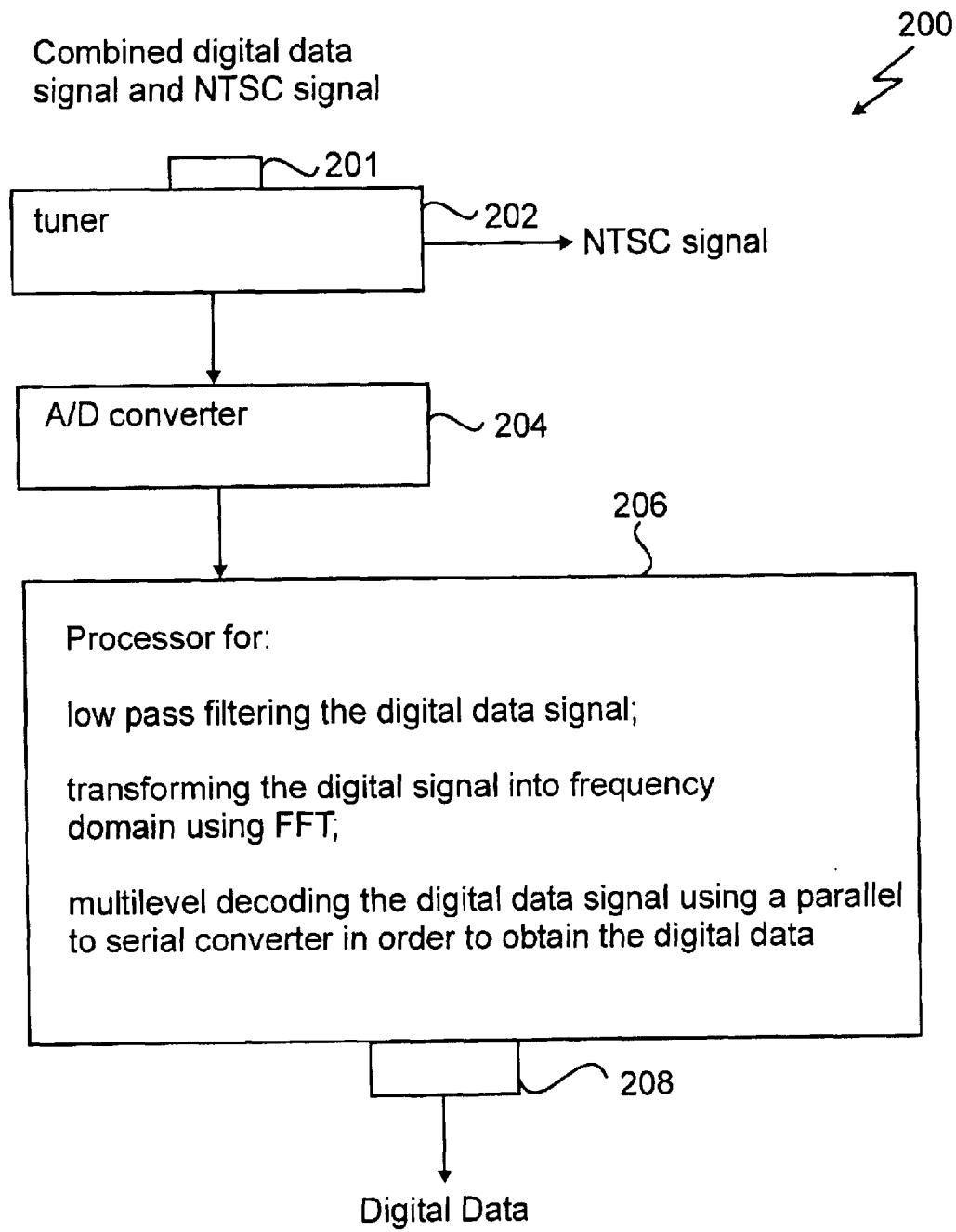
FIG. 12 is a simplified block diagram of a system according to the invention for receiving digital data within an analog TV signal.

At the receiving end, shown in FIGS. 10 and 12 a tuner 202 of a system 200 according to the invention downconverts the combined signal received from port 201 and separates the digital data signal from the NTSC signal. The NTSC signal is processed by a standard NTSC decoder and displayed on a TV screen. The digital data signal is provided to a processor 206 after conversion in A/D converter 204. After low-pass filtering to remove intermodulation products resulting from the downconversion the processor 206 basically reverses the OFDM process shown in FIG. 9. The digital data signal is FFT transformed into frequency domain and multilevel decoded in a parallel to serial converter into the original data. The original data are then provided via port 208 to be displayed on the TV screen or sent to an external computer.

Alternatively, the steps of filtering and FFT transformation are performed using analog devices instead of a digital processor.

Previous research results have demonstrated that different parts of the analog TV spectrum experience different sensitivities to narrowband or tone interference. Detailed information concerning the sensitivities is disclosed by International Telecommunication Union, Recommendation 655: Radio-Frequency Protection Ratios for AM Vestigial Sideband Television Systems, pages 233-249, 1986, which is incorporated hereby for reference. The multi-carrier data broadcasting technique according to the invention takes advantage of this by transmitting the digital data within the vestigial sideband of the video carrier. As is evident to a person of skill in the art, the invention is not limited thereto but is also applicable for inserting a digital data signal in other sections of the spectrum of an analog TV signal.

In the following embodiments of a digital data broadcasting technique according to the invention the digital data transmission rate is further improved without degrading the video quality of the NTSC signal.

Figure 13:
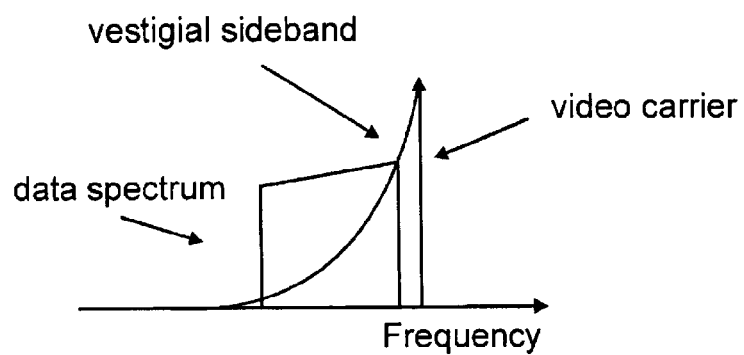
FIG. 13 illustrates a digital data signal spectrum with varying amplitude according to the invention.

It has been observed that the noise floor of the digital data carrier closer to the video carrier is not as large as at the start of the spectrum if the digital data carriers have been inserted with constant amplitude. Therefore, the tail end of the digital data spectrum is more susceptible to interference from the video carrier. To improve the performance the shape of the digital data spectrum has been changed to correlate with the spectrum of the video carrier by varying the amplitude of the digital data carriers, as shown in FIG. 13.

Figure 14:
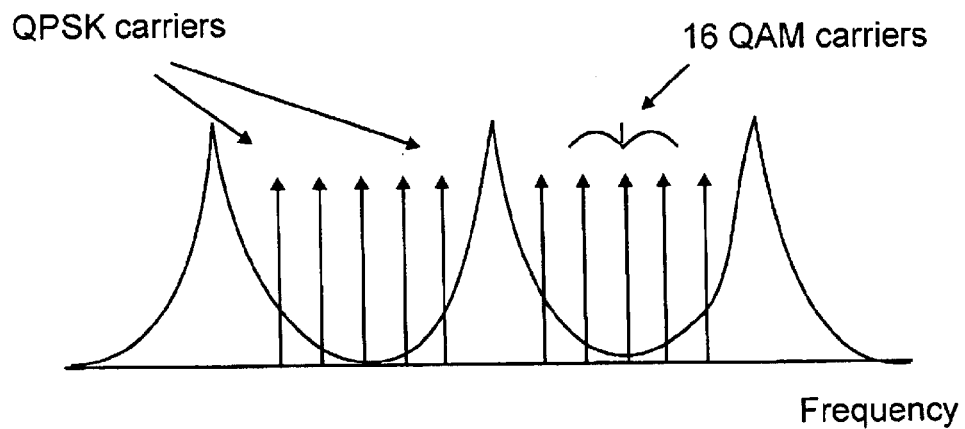
FIG. 14 illustrates carriers with different spectral efficiency of a digital data signal according to the invention.

In another embodiment according to the invention the spectral efficiency of the digital data carriers is increased resulting in a higher data transmission rate. Since the spectral efficiency is set at the input of the IFFT, it is possible to modify each of the digital data carriers. Instead of assigning a same spectral efficiency to all digital data carriers, the carriers located in the middle of the notches of the NTSC signal have a higher spectral efficiency in this embodiment. FIG. 14 illustrates a frequency span covering three NTSC spectral components and two notches. In each of the notches five digital data carriers are inserted. The first and the fifth carrier are Quadrature Phase Shift Keying (QPSK) carriers, while the center carriers are of higher order, for example, 8 Phase Shift Keying (8PSK) or 16 Quadrature Amplitude Modulation (16QAM). The spectrum of the NTSC signal has naturally a lower noise floor in the middle of the notches allowing the insertion of higher order carriers.

In yet another embodiment according to the invention the width of the notches of the digital data signal is gradually increased for notches closer to the video carrier. This increases the total digital data carrier spectrum resulting in a higher data transmission rate, while limiting the impact onto the NTSC signal.

Key parameters in the design of the digital data broadcasting system according to the invention are OFDM carrier spacing, the width of the spectrum notches of the digital data signal, the OFDM signal bandwidth, the carrier location and the operating level relative to the video carrier. The carrier spacing $\Delta f$ between any two bins at the input of the IFFT is defined by the ratio of the sampling rate $f_s$ to N, the size of the Fourier Transform. The size of the Fourier Transform is limited to values that are powers of two. Table 1 lists the values of the carrier spacing for different values of $f_s$ and N. With the carrier spacing defined, it is possible to determine the number of digital data carriers that can be inserted within a 15.75 kHz spectrum interval. The number of digital data carriers $N_c$ within a 15,75 kHz spectrum interval is $$N_c = \frac{15.75 \text{ kHz}}{\Delta f}$$

Table 2 lists the number of carriers within a 15.75 kHz spectrum interval for different values of $f_s$ and N. It must be noted that not all carriers can be used to transmit digital data, because some of the carriers have to be turned off in order to create the notches in the digital data spectrum. The results listed in table 2 indicate that for a given sampling rate increasing the size of the Fourier Transform also increases the number of carriers per 15.75 kHz interval. For a fixed value of N increasing the sampling rate reduces the number of carriers per interval because this also increases the carrier spacing.

Figure 15:
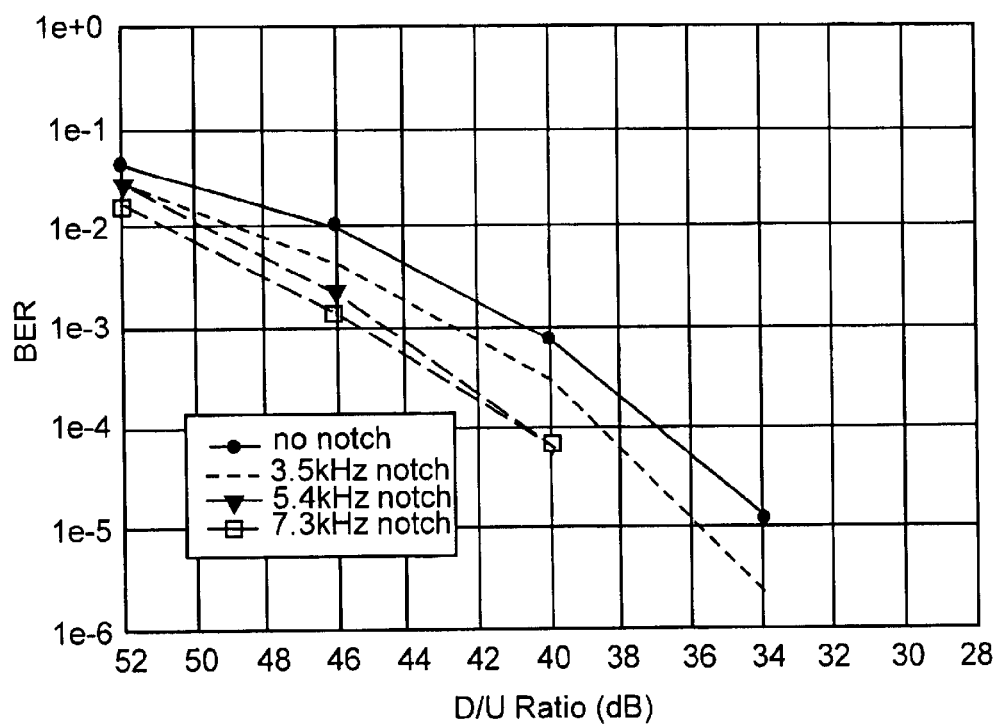
FIG. 15 illustrates BER performance measurements for different width of spectrum notches of a system according to the invention.

Computer simulation and laboratory tests have been performed to determine the range of the key parameters. Thereby, two factors have to be considered:

1) the interference level due to the insertion of the OFDM signal has to be acceptable for analog TV services; and,
2) the robustness of the OFDM signal to withstand interference from the analog TV signal. The starting frequency is set at 1.1 MHz below the video carrier. The bandwidth of the OFDM signal has been determined to be between 250 and 500 kHz. The width of the spectrum notches has been found to be 3 to 4.5 kHz. The OFDM carrier injection level should be 35 to 40 dB below the video carrier power level. A wider OFDM signal bandwidth requires wider spectrum notches and/or higher OFDM signal injection levels to maintain a same operation level. FIG. 15 illustrates a computer simulation of the Bit Error Rate (BER) performance versus Desired to Undesired (D/U) ratio for different width of spectrum notches of an OFDM signal having a bandwidth of 300 kHz. FIG. 15 shows that there is no BER performance gain for spectrum notches wider than 5.4 kHz.

The computer simulations and laboratory tests have shown that the digital data broadcasting technique according to the invention is capable of transmitting digital data within an active TV signal at a substantial higher data transmission rate than prior art systems without causing any degradation to the picture quality noticeable to non-expert viewers.

Numerous other embodiments of the invention will be apparent to persons skilled in the art without departing from the spirit and scope of the invention as defined in the appended claims.

TABLE 1

| | Size of Fourier Transform (N) | | | | | |
|---|---|---|---|---|---|---|
| $f_s$ | 512 | 1024 | 2048 | 4096 | 8192 | 16384 |
| 2 MHZ | 3.91 kHz | 1.95 kHz | 977 Hz | 488 Hz | 244 Hz | 122 Hz |
| 5 MHz | 9.77 kHz | 4.88 kHz | 2.44 kHz | 1.22 kHz | 610 Hz | 305 Hz |
| 6.45 MHz | 12.6 kHz | 6.30 kHz | 3.15 kHz | 1.58 kHz | 788 Hz | 394 Hz |
| 10 MHz | 19.5 kHz | 9.77 kHz | 4.88 kHz | 2.44 kHz | 1.22 kHz | 610 Hz |
| 12.9 MHz | 25.2 kHz | 12.6 kHz | 6.30 kHz | 3.15 kHz | 1.58 kHz | 788 Hz |
| 20 MHz | 39.1 kHz | 19.5 kHz | 9.77 kHz | 4.88 kHz | 2.44 kHz | 1.22 kHz |

| | Size of Fourier Transform (N) | | | | | |
|---|---|---|---|---|---|---|
| $f_s$ | 512 | 1024 | 2048 | 4096 | 8192 | 16384 |
| 2 MHz | 4.0 | 8.1 | 16.1 | 32.3 | 64.5 | 129.0 |
| 5 MHz | 1.6 | 3.2 | 6.5 | 12.9 | 25.8 | 51.6 |
| 6.45 MHz | 1.3 | 2.5 | 5 | 10 | 20 | 40 |
| 10 MHz | 0.8 | 1.6 | 3.2 | 6.5 | 12.9 | 25.8 |
| 12.9 MHz | 0.6 | 1.3 | 2.5 | 5 | 10 | 20 |
| 20 MHz | 0.4 | 0.8 | 1.6 | 3.2 | 6.5 | 12.9 |

What is claimed is:

1. A method for transmitting digital data within an analog TV signal comprising the steps of:
   receiving the digital data from a data source;
   multilevel encoding the digital data and providing a plurality of data symbols in parallel in dependence thereupon; and,
   modulating in frequency domain each of the plurality of data symbols onto a carrier of a plurality of carriers such that each carrier carries a different data symbol for providing a digital data signal in dependence thereupon, wherein some carriers of the plurality of carriers are turned off to shape the spectrum of the digital data signal such that the spectrum of the digital data signal comprises notches at locations coinciding with locations of spectral components of the analog TV signal, and wherein the width of the notches is determined such that degradation of the analog TV signal due to the transmission of the digital data within the analog TV signal is substantially reduced.

2. A method for transmitting digital data within an analog TV signal as defined in claim 1, wherein the step of modulating the plurality of data symbols comprises OFDM.

3. A method for transmitting digital data within an analog TV signal as defined in claim 2, wherein a guard interval is inserted at the beginning of each of the plurality of data symbols.

4. A method for transmitting digital data within an analog TV signal as defined in claim 1, comprising the steps of:
   transforming the digital data signal into time domain;
   combining the transformed digital data signal with the analog TV signal; and,
   transmitting the combined digital data and analog TV signal.

5. A method for transmitting digital data within an analog TV signal as defined in claim 4, wherein the digital data signal is transformed into time domain using IFFT.

6. A method for transmitting digital data within an analog TV signal as defined in claim 4, comprising the step of D/A converting the digital data signal.

7. A method for transmitting digital data within an analog TV signal as defined in claim 6, comprising the step of RF upconverting the combined digital data and analog TV signal to a broadcaster's RF frequency.

8. A method for transmitting digital data within an analog TV signal as defined in claim 4, comprising the steps of:
  receiving the combined digital data and analog TV signal;
  separating the digital data signal from the analog TV signal;
  transforming the digital data signal into frequency domain; and,
  multilevel decoding the digital data signal using a parallel to serial converter in order to obtain the digital data.

9. A method for transmitting digital data within an analog TV signal as defined in claim 8, comprising the step of downconverting the received signal.

10. A method for transmitting digital data within an analog TV signal as defined in claim 9, comprising the step of A/D converting the separated digital data signal.

11. A method for transmitting digital data within an analog TV signal as defined in claim 10, comprising the step of low-pass filtering the digital data signal.

12. A method for transmitting digital data within an analog TV signal comprising the steps of:
  receiving the digital data from a data source;
  multilevel encoding the digital data and providing a plurality of data symbols in dependence thereupon;
  modulating in frequency domain each of the plurality of data symbols onto a carrier of a plurality of carriers such that each carrier carries a different data symbol using a serial to parallel converter for providing a digital data signal in dependence thereupon, wherein some carriers of the plurality of carriers are turned off in order to shape the spectrum of the digital data signal such that the spectrum of the digital data signal comprises notches at locations coinciding with locations of spectral components in the vestigial sideband of the video carrier of the analog TV signal, and wherein the width of the notches is determined such that degradation of the analog TV signal due to the transmission of the digital data within the analog TV signal is substantially reduced;
  transforming the digital data signal into time domain using IFFT; D/A converting the digital data signal;
  combining the digital data signal with the analog TV signal by inserting the digital data signal in the vestigial sideband of the video carrier;
  RF upconverting the combined digital data and analog TV signal to a broadcaster's RF frequency; and,
  transmitting the upconverted combined digital data and analog TV signal.

13. A method for transmitting digital data within an analog TV signal as defined in claim 12, wherein the shape of the spectrum of the digital data signal correlates with the shape of the spectrum of the video carrier.

14. A method for transmitting digital data within an analog TV signal as defined in claim 13, wherein different digital data carriers have a different amplitude in order to correlate the shape of the spectrum of the digital data signal with the shape of the spectrum of the video carrier.

15. A method for transmitting digital data within an analog TV signal as defined in claim 12, wherein the digital data carriers located in proximity to the center of notches between two consecutive spectral components of the TV signal have a higher spectral efficiency than digital data carriers located closer to the spectral components.

16. A method for transmitting digital data within an analog TV signal as defined in claim 12, wherein the width of the notches of the digital data signal is gradually increased for notches located closer to the video carrier.

17. A method for transmitting digital data within an analog TV signal as defined in claim 12, wherein the analog TV signal comprises a NTSC signal.

18. A method for transmitting digital data within an analog TV signal as defined in claim 17, wherein the beginning of the digital data signal is located 1.1 MHz below the video carrier frequency.

19. A method for transmitting digital data within an analog TV signal as defined in claim 18, wherein bandwidth of the digital data signal is between 250 and 500 kHz.

20. A method for transmitting digital data within an analog TV signal as defined in claim 19, wherein the width of the notches in the spectrum of the digital data signal is between 3 and 4.5 kHz.

21. A system for transmitting digital data within an analog TV signal comprising:
  a port for receiving the digital data from a data source;
  a processor for encoding the digital data and providing data symbols, for modulating in frequency domain each of the data symbols onto a carrier of the plurality of carriers such that each carrier carries a different data symbol using a serial to parallel converter for providing a digital data signal, wherein some carriers of the plurality of carriers are turned off in order to shape the spectrum of the digital data signal such that the spectrum of the digital data signal comprises notches at locations of spectral components of the analog TV signal, and for transforming the digital data signal into time domain using IFFT;
  a D/A converter for converting the digital data signal;
  a combiner for combining the digital data signal with the analog TV signal; and,
  a RF upconverter for upconverting the combined signal to a broadcaster's RF frequency for transmission.

22. A system for transmitting digital data within an analog TV signal as defined in claim 21, comprising:
  a second other port for receiving the transmitted signal;
  a tuner for downconverting the received signal and for separating the digital data signal from the analog TV signal;
  an A/D converter for converting the digital data signal; and,
  a processor for low pass filtering the digital data signal, for transforming the digital data signal into frequency domain using FFT, and for multilevel decoding the digital data signal using a parallel to serial converter in order to obtain the digital data.

* * * * *